United States Patent Office

2,763,533
Patented Sept. 18, 1956

2,763,533

SILICA-CONTAINING GELS

Kenneth D. Ashley and William B. Innes, Stamford, and Emerson V. Paul, Springdale, Conn., assignors to American Cyanamid Company, New York, N. Y., a corporation of Maine No Drawing. Application December 31, 1952,
Serial No. 329,124

4 Claims. (Cl. 23—182)

This invention relates to silica-containing gels which have a low apparent bulk density and which are easily disintegrable into a very fine particle size, and to improved methods of manufacturing the same. More particularly, this invention relates to silica or silica-alumina gels having such characteristics and which may be manufactured by simpler and more economical methods.

Silica-containing gels having such properties have been manufactured hitherto and have been found generally useful for catalytic purposes, thermal insulation, etc., where the characteristics of low apparent bulk density and high porosity are advantageous, and in other industrial applications, such as: flatting agents to produce matte finishes in various types of coatings (varnishes, lacquers, vinyl resin coatings, resin dispersions, etc.); bodying agents in printing inks and non-aqueous liquids; application aids for rubber cements; bulking agents for dry powders, free-flowing and anti-caking agents for dry powders; reinforcing agents for rubber; pigments; and so forth, where the property of facile disintegration into particles of a very fine size is desirable.

These silica-containing gels have been found to be satisfactorily applicable by the industry in the above-mentioned and other uses but hitherto the manufacture of such gels has been complicated and rather expensive and such factors have acted as deterrents to their more widespread use.

It is therefore a principal object of the present invention to prepare silica-containing gels which have a low apparent bulk density and a high porosity, which are easily disintegrable into a very fine particle size and which may be manufactured in a simple and economical manner.

A feature of the present invention is the formation of a hydrogel which is much harder than the usual hydrogel and which possesses a much higher solids content. Further features are noted in that it is much easier to wash such a hydrogel by filtration or decantation with a smaller wash water requirement, as a result of such advantageous properties.

A further feature of the present invention is the unexpected relative softness of the xerogel obtained from such a hydrogel which renders it readily amenable to milling or other operations intended to reduce the particle size to a state of extreme fineness.

Other objects and features, as well as purposes and advantages, of the present invention will become apparent from a consideration of the following specification wherein we have set forth the preferred embodiment of our inventive concept by way of illustration but not in limitation thereof.

We have found that readily friable and disintegrable silica-containing gels of extremely low apparent bulk density may be prepared very simply and very economically by a novel formation of the silica gel slurry which may be then processed by the conventional steps of filtering or decantation, washing, heating, calcining, etc., to form the desired finished gel product.

Our novel formation of the silica gel comprises the substantially simultaneous admixing of a diluted sodium silicate solution having a high pH and a silicic acid solution having a low pH (made by adding sodium silicate solution to an acid) in such proportions as to maintain a pH of 6.0–8.5 during the admixture and in such a manner that such solutions are admixed in the presence of a gel for practically all of the time during the admixing.

Commercial sodium silicate is marketed in various forms, such as pure crystals; crude lumps or powder; C. P.; or in solutions of various concentrations ranging from viscous semi-liquids to thin watery fluids. Although any of these forms are useful as starting materials for the application of the principles of the present invention, it will be readily appreciated that a solution of sodium silicate is the most adaptable form due to the ease of handling and facility of reaction with other solutions.

In addition to appearing on the market in various concentrations, these sodium silicate solutions also appear in various molar ratios of $SiO_2$ to $Na_2O$. For example, such solutions are available in such ratios as 3.9 $SiO_2$ to 1.0 $Na_2O$, 3.36 $SiO_2$ to 1.0 $Na_2O$ and so on down to 1.69 $SiO_2$ to 1.0 $Na_2O$ with various intervening ratios, or higher and lower proportions. The particular form, concentration, or specific proportion of ingredients contained therein does not form an essential or critical part of the invention and, therefore, in the following discussion and pertinent examples wherein "N Brand" sodium silicate solution having a 28.7% $SiO_2$ to 8.90% $Na_2O$ proportion, 41.0° Baumé and a highly basic pH of approximately 12–14, is used, such is to be considered illustrative but not limitative of the invention.

For the purposes of this invention, therefore, the term "commercial sodium silicate" is intended to refer to and include any and all of the forms above-mentioned, or equivalents thereto. Further, for the purposes of a clearer understanding of this invention, the term "commercial basicity," when used in this description of the invention, refers to the pH normally present in a commercial sodium silicate solution. This is normally on the order of a pH of about 12–14.

The diluted sodium silicate of the present invention may be prepared from substantially any of the above-mentioned forms of sodium silicate but it is preferred that the particularly above-described "N Brand" sodium silicate solution be used. Such a diluted solution may be very easily prepared by the addition of sufficient water to the commercial sodium silicate solution to bring the $SiO_2$ concentration down to the range of 3–12% $SiO_2$, with the preferred concentrations lying in the range 5%–8% $SiO_2$. Such ranges have been determined to be well-suited for the application of the principles of the inventive concept here involved.

If the concentration of the original sodium silicate solution is within the desired concentration range, it is apparent that no dilution will then be required. It is merely to be noted that the concentration of the sodium silicate used in admixing with the silicic acid solution or in preparing the same be in the 3–12% range.

The silicic acid colloidal solution may be prepared from the diluted sodium silicate solution (3–12% $SiO_2$) by adding it to a sufficient amount of an acid such as preferably a mineral acid such as sulfuric acid, hydrochloric acid, nitric acid, and the like, so as to keep the pH of the silicic acid colloidal solution always within the range of 1–4.5 and preferably within the range of pH 1–3.

The mineral acid employed in the preparation of the silicic acid solution may be of any desired strength, but, in the interests of facility of use and the avoidance of local effects, a low concentration, such as in the range of 8%–13% in the case of sulfuric acid, has been found preferable. Other mineral acids should have equivalent concentration ranges.

The preparation of the silicic acid solution is carried out by simply adding the diluted sodium silicate solution with good agitation to the mineral acid in the requisite proportions so that the pH substantially always remains in the range 1–4.5. The resulting mixture is preferably then given an aging period.

The diluted sodium silicate solution and the silicic acid solution are substantially simultaneously admixed with good agitation to insure a rapid and thorough intermixing thereof in any desired mixing apparatus such as a screen-shrouded turbo-mixer. The proportions of the added solutions and the rates of their addition must be so controlled and related that the pH of the mixture remains within the range 6.0–8.5, and preferably within the range 6.5–8.0, during such admixture. Gelation occurs very shortly after or perhaps immediately upon confluence of the two streams of solution at such a pH range so that silicate and acid are being added simultaneously to a gel slurry for practically all of this admixing step. The slurry is preferably well agitated during this time.

One of the reasons advanced for the low bulk density of the product obtained by this substantially simultaneous method may be that the fresh silicate and acid penetrate into the wet gel which is already formed before reacting with each other. Such a theory of a "gel formation inside a gel" would appear to be quite plausible in that such a procedure would be naturally expected to cement the initial structure of the gel already formed so as to render it more resistant to shrinkage on heating and/or calcination.

It is therefore realized that the initial confluence of the sodium silicate solution and the silicic acid solution should be accompanied by good agitation and as rapid and as thorough an intermixing of these solutions take place as is possible under the existing circumstances. Such action will insure the presence of a gel during practically all of the time of the addition of the solutions.

It is not necessary that such elaborate precautions be taken as to the agitation to insure the substantially immediate formation of the silica gel upon the admixture of the two solutions. If desired, a heel consisting of a portion of a silica gel slurry, or even a silica-alumina gel slurry, from a previous run may be initially placed in the mixing device and the two separate streams directed substantially simultaneously thereinto with good agitation of the resulting mixture. If such a method is employed, a small portion of the resulting gel slurry should be set aside at the conclusion of the gel formation and reserved as a heel for the processing of a subsequent batch.

The silica gel so formed should be aged for a sufficient time at a high enough temperature and it has been found that a minimum aging time should be on the order of at least 30 minutes and at a temperature preferably greater than 10° C. However, the longer the time that the gel is aged and the higher the temperature of aging, even up to the boiling point of the mixture, then, the better are the properties and characteristics of apparent bulk density and distintegrability ultimately developed. Such aging leads to a greater strengthening of the hydrogel structure and makes for a harder hydrogel having a much higher solids content which renders it much easier to wash by filtration or by decantation in that, for example, lesser amounts of wash water are required. As a consequence, the porosity of the dried gel resulting from the heating and calcination of the hydrogel is on the order of 1.0 cc./gram or greater which is a far greater porosity than that of xerogels made by comparable methods, which is on the order of up to about 0.5 cc./gram. Where optimum conditions of time and temperature of aging have existed, porosities of up to 2.0 cc./gram have been developed.

One of the more important characteristics of the dried gel is noted in its friability or its ability to be easily rubbed or crumbled, such as merely by pressure applied between the fingers, into a finely divided pulverized material of a very fine particle size, similar to a face powder, on the order of 1 micron or less.

The pulverulent material finds application in fields where particles substantially of colloidal size are required, such as in rubber compounding. Other uses would be as a flatting agent in the production of matte finishes in various types of coating; as a molding or forming material in the formation of pelleted catalytic material; as a reinforcing agent similar to carbon black in rubber; as an application aid for rubber cements; etc.

The silica-gel so formed may be processed by the conventional steps of aging, filtering or decantation, washing, heating, calcining, etc., such as set forth and described in greater detail in U. S. Letters Patents 2,411,820 and 2,478,519. Inasmuch as these steps are conventional and well known in the art, further description thereof is deemed unnecessary.

If desired, other metallic oxides may be precipitated, deposited or otherwise coated on the silica gel so formed. For example, the gel may be treated with alum and ammonia, as set forth in the latter-mentioned Letters Patent whereby a silica-alumina gel may be obtained. In a similar fashion, other oxides such as chromia, molybdena, and the like, may be substituted for or used in addition to the alumina.

The invention will be further illustrated in greater detail by the following specific examples. It should be understood, however, that although these examples may describe in particular detail some of the more specific features of the invention, they are given primarily for purposes of illustration and the invention in its broader aspects is not to be construed as limited thereto.

*Example 1*

Materials used: 24.8 pounds of a heel consisting of a portion of a silica gel slurry from a previous run; 24.5 pounds of 8% sulfuric acid solution; and 58 pounds of sodium silicate solution (N brand, 28.7% $SiO_2$, 8.90 $Na_2O$, 41.0° Baumé) diluted to 7.4% $SiO_2$.

Procedure: 50 pounds of the diluted sodium silicate solution was added to 24.5 pounds of the sulfuric acid solution with good agitation to a pH of approximately 2.5.

The heel was first added to a screen-shrouded turbo-mixer. The acidified (pH 2.5) sodium silicate solution (acid colloid) was then added with good agitation to the heel substantially simultaneously with the addition of the remaining portion of the diluted sodium silicate solution (7.4% $SiO_2$) and the rates of addition of the two solutions were so adjusted as to maintain a pH range of the confluent mixture of 7.7 to 8.0. A temperature of approximately 26° C. was maintained during the addition and the silica content of the resulting gel slurry was determined to be 5.1%. 25 pounds of this slurry was set aside and reserved as a heel for subsequent batches.

The remaining portion of the slurry was then removed from the turbo-mixer and was aged for approximately one and one-half hours with gate agitation.

7.6 pounds of 7% aluminum sulfate solution was added to 76 pounds of the above slurry. 3.3 pounds of a 14% ammonia solution was then added to the slurry mixture to give a pH of 4.8. The slurry was then filtered on filter crocks and the cake washed with 75 pounds of demineralized water. The resulting cake (13.5% solids) was reslurried to 10% $SiO_2$ content and again filtered on filter crocks. The cake was washed with 80 pounds of demineralized water.

The silica-alumina cake (20.5% solids) was calcined in a conventional manner in an indirect-fired kiln to a temperature of 990° F. The product was a pebbly white material which could be crushed or pulverized by merely lightly pressing between the fingers until a powdery mass was obtained.

*Example 2*

The procedure set forth in Example 1 was followed generally except that a lesser amount of water was added to dilute the commercial sodium silicate solution (N brand) to a higher concentration of approximately 11.3% SiO$_2$, and the concentration of the sulfuric acid solution used was greater, i. e., 12.9%. As a result, a slurry having 7.8% SiO$_2$ was obtained (as compared to 5.1% SiO$_2$ previously obtained) when the diluted sodium silicate solution was added substantially simultaneously with an acidified sodium silicate solution (acid colloid, pH 2.0) to the heel of a preceding run. The results of this example and the properties of the resulting product were substantially the same as that obtained in the preceding example except that the apparent bulk density of the product derived therein was 0.24 gram per cc., whereas in the present example the apparent bulk density was 0.22 gram per cc. The product again could be reduced to a face powder pulverulent mass by pressure exerted by the fingers.

Although we have described but a few specific examples of our inventive concept, we consider the same not to be limited to the specific substances mentioned therein but to include various other compounds of equivalent constitution as set forth in the claims appended hereto. It is understood, of course, that any suitable changes, modifications and variations may be made without departing from the spirit and scope of the invention.

What we claim is:

1. In a method of preparing a silica-containing gel which comprises forming a silica gel slurry, dewatering, washing and drying the same, the improvement which comprises forming the silica gel slurry by diluting a commercial sodium silicate solution to 3–12% SiO$_2$, adding said diluted sodium silicate solution to a mineral acid to form a silicic acid solution within the pH range of 1.0–4.5, and substantially simultaneously admixing with agitation and in the presence of a heel consisting of a portion of a silica gel slurry from a previous run said silicic acid solution with additional diluted sodium silicate solution containing 3–12% SiO$_2$ in such proportions as to maintain a pH of 6.0–8.5 during such admixture to form a silica gel slurry which is capable of conversion by dewatering, washing and drying into a low apparent bulk density silica-containing gel which is easily disintegrable into a very fine particle size.

2. In a method of preparing a silica-containing gel which comprises forming a silica gel slurry, dewatering, washing and drying the same, the improvement which comprises forming the silica gel slurry by diluting a commercial sodium silicate solution to 5–8% SiO$_2$, adding said diluted sodium silicate solution to a mineral acid to form a silicic acid solution within the pH range of 1.0–4.5, and substantially simultaneously admixing with agitation and in the presence of a heel consisting of a portion of a silica gel slurry from a previous run, said silicic acid solution with additional diluted sodium silicate solution containing 5–8% SiO$_2$ in such proportions as to maintain a pH of 6.0–8.5 during such admixture to form a silica gel slurry which is capable of conversion by dewatering, washing and drying into a low apparent bulk density silica-containing gel which is easily disintegrable into a very fine particle size.

3. In a method of preparing a silica-containing gel which comprises forming a silica gel slurry, dewatering, washing and drying the same, the improvement which comprises forming the silica gel slurry by diluting a commercial sodium silicate solution to 5–8% SiO$_2$, adding said diluted sodium silicate solution to a mineral acid to form a silicic acid solution within the pH range of 1–3, and substantially simultaneously admixing with agitation and in the presence of a heel consisting of a portion of a silica gel slurry from a previous run said silicic acid solution with additional diluted sodium silicate solution containing 5–8% SiO$_2$ in such proportions as to maintain a pH of 6.0–8.5 during such admixture to form a silica gel slurry which is capable of conversion by dewatering, washing and drying into a low apparent bulk density silica-containing gel which is easily disintegrable into a very fine particle size.

4. In a method of preparing a silica-containing gel which comprises forming a silica gel slurry, dewatering, washing and drying the same, the improvement which comprises forming the silica gel slurry by diluting a commercial sodium silicate solution to 5–8% SiO$_2$, adding said diluted sodium silicate solution to a mineral acid to form a silicic acid solution within the pH range of 1–3, and substantially simultaneously admixing with agitation and in the presence of a heel consisting of a portion of a silica gel slurry from a previous run said silicic acid solution with additional diluted sodium silicate solution containing 5–8% SiO$_2$ in such proportions as to maintain a pH of 6.5–8.0 during such admixture to form a silica gel slurry which is capable of conversion by dewatering, washing and drying into a low apparent bulk density silica-containing gel which is easily disintegrable into a very fine particle size.

References Cited in the file of this patent

UNITED STATES PATENTS

| | | |
|---|---|---|
| 1,413,457 | Collins | Apr. 18, 1922 |
| 2,483,868 | Archer et al. | Oct. 4, 1949 |
| 2,601,235 | Alexander | June 24, 1952 |